United States Patent
Muth et al.

(10) Patent No.: US 8,494,718 B2
(45) Date of Patent: Jul. 23, 2013

(54) STEERING DEVICE FOR ADJUSTING A WHEEL STEERING ANGLE

(75) Inventors: Norman Muth, Frankenberg (DE);
Steffen Linkenbach, Eschborn (DE);
Jürgen Böhm, Oberneisen (DE); Tom Kaufmann, Ippenschied (DE)

(73) Assignee: Continental Teves AG & Co. oHG (DE)

( * ) Notice: Subject to any disclaimer, the term of this patent is extended or adjusted under 35 U.S.C. 154(b) by 532 days.

(21) Appl. No.: 12/602,903

(22) PCT Filed: Jun. 4, 2008

(86) PCT No.: PCT/EP2008/056921
§ 371 (c)(1),
(2), (4) Date: May 7, 2010

(87) PCT Pub. No.: WO2008/148806
PCT Pub. Date: Dec. 11, 2008

(65) Prior Publication Data
US 2010/0241314 A1    Sep. 23, 2010

(30) Foreign Application Priority Data

| Jun. 4, 2007 | (DE) | 10 2007 026 198 |
| Sep. 27, 2007 | (DE) | 10 2007 046 633 |
| Feb. 19, 2008 | (DE) | 10 2008 010 069 |
| Apr. 14, 2008 | (DE) | 10 2008 018 978 |

(51) Int. Cl.
*B62D 5/04* (2006.01)
*B62D 6/00* (2006.01)

(52) U.S. Cl.
USPC ............................................. 701/42

(58) Field of Classification Search
USPC ...................................... 701/41–44
See application file for complete search history.

(56) References Cited

U.S. PATENT DOCUMENTS

| 4,782,907 A | * | 11/1988 | Morishita et al. | 180/412 |
| 4,828,061 A | * | 5/1989 | Kimbrough et al. | 180/413 |
| 4,836,319 A | * | 6/1989 | Haseda et al. | 180/412 |
| 4,874,054 A | * | 10/1989 | Watanabe | 180/414 |
| 4,949,261 A | * | 8/1990 | Ito et al. | 701/41 |
| 5,010,971 A | * | 4/1991 | Hamada et al. | 180/412 |
| 5,018,594 A | * | 5/1991 | Takahashi et al. | 180/412 |
| 5,020,619 A | * | 6/1991 | Kanazawa et al. | 180/412 |

(Continued)

FOREIGN PATENT DOCUMENTS

| DE | 39 42 494 A1 | 7/1990 |
| DE | 44 19 317 A1 | 12/1994 |

(Continued)

OTHER PUBLICATIONS

JPO machine translation of JP 6-211148 A.*

(Continued)

*Primary Examiner* — Mary Cheung
*Assistant Examiner* — David Testardi
(74) *Attorney, Agent, or Firm* — RatnerPrestia

(57) ABSTRACT

A steering device for adjusting a wheel steering angle of a wheel of a motor vehicle is disclosed, which steering device has a wheel guide member and a steering control unit. The steering control unit includes a basic steering function and an actuator travel control system for adjusting travel of the wheel guide member on the basis of a steering angle setpoint value.

30 Claims, 9 Drawing Sheets

U.S. PATENT DOCUMENTS

| | | | |
|---|---|---|---|
| 5,402,341 A * | 3/1995 | Liubakka et al. | 701/42 |
| 5,561,603 A * | 10/1996 | Goto | 701/41 |
| 5,576,957 A * | 11/1996 | Asanuma et al. | 701/42 |
| 5,732,371 A * | 3/1998 | Fujita | 701/38 |
| 5,991,675 A | 11/1999 | Asanuma | |
| 6,157,892 A | 12/2000 | Hada et al. | |
| 6,381,527 B1 * | 4/2002 | Furumi et al. | 701/41 |
| 6,535,806 B2 * | 3/2003 | Millsap et al. | 701/42 |
| 6,546,323 B2 * | 4/2003 | Deguchi et al. | 701/41 |
| 6,625,529 B2 * | 9/2003 | Obata et al. | 701/41 |
| 6,678,597 B2 * | 1/2004 | Amberkar | 701/41 |
| 6,799,104 B2 * | 9/2004 | Yao et al. | 701/41 |
| 6,879,118 B2 * | 4/2005 | Cao et al. | 318/34 |
| 7,130,729 B2 * | 10/2006 | Shin et al. | 701/42 |
| 2002/0156581 A1 * | 10/2002 | Matsuura | 701/301 |
| 2004/0206570 A1 * | 10/2004 | Tajima et al. | 180/402 |

FOREIGN PATENT DOCUMENTS

| | | |
|---|---|---|
| DE | 197 20 602 A1 | 1/1998 |
| DE | 199 26 745 B4 | 12/1999 |
| JP | 62149561 A * | 7/1987 |
| JP | 62155173 A * | 7/1987 |
| JP | 02011474 A * | 1/1990 |
| JP | 02204178 A * | 8/1990 |
| JP | 04349070 A * | 12/1992 |
| JP | 06211148 A * | 8/1994 |
| JP | 07002127 A * | 1/1995 |
| JP | 11115709 A * | 4/1999 |
| WO | WO 2006/117343 A1 | 11/2006 |

OTHER PUBLICATIONS

JPO machine translation of JP 11-115709 A.*
JPO machine translation of JP 7-2127 A.*
JPO machine translation of JP 6-211148 A (original JP document published Aug. 2, 1994).*
JPO machine translation of JP 11-115709 A (original JP document published Apr. 27, 1999).*
JPO machine translation of JP 7-2127 A (original JP document published Jan. 6, 1995).*

* cited by examiner

STEERING DEVICE FOR ADJUSTING A WHEEL STEERING ANGLE

CROSS REFERENCE TO RELATED APPLICATIONS

This application is the U.S. national phase application of PCT International Application No. PCT/EP2008/056921, filed Jun. 4, 2008, which claims priority to German Patent Application No. 10 2007 026 198.7, filed Jun. 4, 2007, and German Patent Application No. 10 2007 046 633.3, filed Sep. 27, 2007, and German Patent Application No. 10 2008 010 069.2, filed Feb. 19, 2008, and German Patent Application No. 10 2008 018 978.2, filed Apr. 14, 2008, the contents of such applications being incorporated by reference herein.

BACKGROUND OF THE INVENTION

1. Field of the Invention

The invention relates to steering systems of motor vehicles. In particular, the invention relates to a steering device for adjusting a wheel steering angle of a wheel of a motor vehicle, a vehicle having a steering device, the use of such a steering device in a vehicle, a method for adjusting a wheel steering angle of a wheel of a motor vehicle, and a program element and a computer-readable medium.

2. Description of the Related Art

Known steering devices for rear-axle steering have, similarly to conventional front-axle steering systems, a steering tie rod which connects the right-hand and left-hand rear wheels to one another. A wheel steering angle is adjusted here by moving the steering tie rod under electromechanical or electrohydraulic control. However, such steering devices require considerable structural expenditure.

SUMMARY OF THE INVENTION

An object of the invention is to specify an improved steering function and improved actuator control for adjusting an axle steering angle, for a wheel steering system, which is predefined on the basis of the steering function.

A steering device, a vehicle, a use, a method, a program element and a computer-readable medium are disclosed.

The described exemplary embodiments relate equally to the steering device, the vehicle, the use, the method, the program element and the computer-readable medium.

According to an exemplary embodiment of the invention, a steering device for adjusting a wheel steering angle of a wheel of a motor vehicle is specified, which steering device has a wheel guide member for changing the wheel steering angle of the wheel and a steering control unit for controlling the wheel guide member. The steering control unit comprises here a first acquisition unit for a basic steering function and an actuator control system (or actuator travel control system). The first acquisition unit for the basic steering function is designed to acquire a first steering angle setpoint value and for this purpose receives input signals from sensors. The input signals represent at least the vehicle speed and the driver steering angle. The actuator (travel) control system is designed to adjust travel of the wheel guide member on the basis of the first steering angle setpoint value.

It is to be noted in this context that additional modules can also be connected between the first acquisition unit and the actuator travel control system in order, for example, to integrate steering interventions on the part of the driver or functions above and beyond the steering system.

In other words, the control system controls the travel, which, of course, also has to be detected, and adjusts the travel on the basis of the steering angle setpoint value.

The steering device of the present invention has an improved steering function and improved actuator control.

According to a further exemplary embodiment of the invention, the steering device also has an arbitration unit and a second acquisition unit. The arbitration unit serves to acquire a second, corrected steering angle setpoint value from the first steering angle setpoint value, which corrected steering angle setpoint value is then fed to the second acquisition unit. The second acquisition unit is connected upstream of the actuator travel control system for the adjustment of travel of the wheel guide member.

In other words, the setpoint value, which is calculated by the basic steering function (first acquisition unit), for the steering angle is modified by the arbitration unit. The steering angle setpoint value can be modified, for example, on the basis of additional steering angle correction signals of a vehicle movement dynamics controller and of a scaling factor.

The second acquisition unit then calculates, on the basis of the second, corrected steering angle setpoint value, the travel of the wheel guide member (steering tie rod travel), which is then fed to the actuator travel control system. From this setpoint value, the actuator travel control system then calculates suitable manipulated variables for the actuator or actuators in order to adjust the wheel guide member correspondingly.

According to a further exemplary embodiment of the invention, the arbitration unit is designed to calculate the steering angle setpoint value on the basis of a setpoint value which is made available by the first acquisition unit and which corresponds to a driver specification, a steering angle correction signal and a scaling factor for attenuating a driver's portion.

According to a further exemplary embodiment of the invention, the wheel is a rear wheel of the motor vehicle.

The steering device is therefore in this case an (electromechanically actuable) rear-wheel steering system (ARK).

However, the steering device can also be used to correct or control a front-wheel steering system.

According to a further exemplary embodiment of the invention, the steering device is designed to carry out a wheel-specific steering movement.

The left-hand and right-hand rear wheels and the left-hand and right-hand front wheels can therefore be steered independently of one another individually.

According to a further exemplary embodiment of the invention, the steering device also has a drive unit, wherein the length of the wheel guide member can be adjusted by means of the drive unit, and wherein a change in the length of the wheel guide member brings about a change in the wheel steering angle of the wheel.

According to a further exemplary embodiment of the invention, the steering device also has a wheel mount for mounting the wheel. The wheel mount is connected to a vehicle body via the wheel guide member, wherein the wheel mount can be adjusted about an axis extending essentially parallel to the plane of the wheel, and the wheel guide member is coupled to the wheel mount at a distance (that is to say spaced apart) from the axis.

According to a further exemplary embodiment of the invention, the actuator travel control system has a position controller, a motor speed controller for an electric motor of the wheel guide member, a first control loop for making available a motor speed actual value for the electric motor of the wheel guide member, and a second control loop for making available a steering tie rod actual value for the position controller.

According to a further exemplary embodiment of the invention, the acquisition unit for the basic steering function has a speed booster unit for acquiring a dynamic portion for the first steering angle setpoint value.

According to a further exemplary embodiment of the invention, the first acquisition unit for the basic steering function has a steering transmission unit for acquiring a variable steering transmission factor ($i_{VSR}$) on the basis of a current vehicle speed, from which a static portion for the first steering angle setpoint value is then calculated.

According to a further exemplary embodiment of the invention, the first acquisition unit is designed to modify the variable steering transmission factor as a function of a driver's specification.

According to a further exemplary embodiment of the invention, the variable steering transmission factor is modified as a function of the current vehicle speed.

According to a further exemplary embodiment of the invention, the driver's specification corresponds to a measured steering wheel angle and a steering wheel angle speed.

In this context it is possible, according to a further exemplary embodiment of the invention, for the modification to be carried out on the basis of fuzzy logic.

According to a further exemplary embodiment of the invention, the steering transmission factor is modified using a scaling factor which is limited, as a function of the velocity, to values which are appropriate in terms of driving stability.

In other words, the steering transmission factor $i_{VSR,Base}$ which is dependent on the vehicle speed is modified as a function of the driver specifications steering wheel angle and steering wheel angle speed. This is done using a scaling factor SC for $i_{VSR,Base}$, which is limited, as a function of the velocity, to values which are appropriate in terms of driving stability. As a result, the ratio of front-wheel steering angle to rear-wheel steering angle, which is determined by the steering transmission factor $i_{VSR}$, can be adapted better to the respective operating state of the vehicle, defined here by the vehicle speed, the driver steering angle and the driver steering angle speed.

According to a further exemplary embodiment of the invention, the steering device also has a sensor device for making available measurement data from the surroundings of the vehicle. The measurement data are included in the closed-loop or open-loop control process of the wheel steering angle of the wheel.

According to a further exemplary embodiment of the invention, the sensor device may be a radar sensor, a lidar sensor, an optical sensor or an ultrasonic sensor. Combinations of these types of sensor may also be provided and also be included in the acquisition of the setpoint value for the wheel steering angle.

According to a further exemplary embodiment of the invention, the sensor device also has a position-determining unit with a satellite navigation receiver and a digital map.

The satellite navigation receiver can be designed for a global navigation satellite system (GNSS), such as for example GPS, Galileo, GLONASS (Russia), KOMPASS (China), IRNSS (India).

The additional information from the digital map can be used, when paired with precise position details relating to the current position of the vehicle, to generate safety-related data which are also included in the acquisition of the setpoint value for the wheel steering angle of the wheel.

For example, it may be indicated on the digital map that there is oil or foliage on the roadway.

If an avoidance maneuver is necessary, said maneuver can be assisted at a correspondingly earlier time since severe changes in direction are not possible in this case.

According to a further exemplary embodiment of the invention, the sensor device is designed to determine a distance between the vehicle and an object.

The object is, for example, another vehicle or some other obstacle.

According to a further exemplary embodiment of the invention, the steering device also has an analysis unit for analyzing the measurement data and for detecting a hazardous situation on the basis of the analysis, wherein the steering system is designed to adapt the steering function to the hazardous situation if a hazardous situation has been detected.

According to a further exemplary embodiment of the invention, the adaptation of the steering function to the hazardous situation comprises automatic switching over from the current basic steering function to an identically acting static characteristic curve for the variable steering transmission ratio.

According to a further exemplary embodiment of the invention, the analysis is based on the distance, determined by the sensor device, between the vehicle and the object and an estimated time after which a critical distance from the object is reached.

This permits safety in road traffic to be increased further.

At this point it is to be noted that the exemplary embodiments described above and those described below are independent of a specific structural embodiment of the wheel steering system and can therefore be used either in a steering arrangement with two separate individual actuators for each rear wheel or front wheel or with a central actuator.

According to a further exemplary embodiment of the invention, the steering device also has a fixed value controller for determining an additional motor setpoint torque and a function module for demand-dependent or situation-dependent activation of the fixed value controller.

According to a further exemplary embodiment of the invention, the additional motor setpoint torque is determined by the fixed value controller on the basis of a position of the motor which is measured by a sensor.

According to a further exemplary embodiment of the invention, the sensor is a travel sensor or a motor angle sensor.

According to a further exemplary embodiment of the invention, the fixed value controller is a motor controller with a proportional-differential behavior.

According to a further exemplary embodiment of the invention, the fixed value controller is activated by the function module on the basis of the steering tie rod setpoint value from the second acquisition unit.

According to a further exemplary embodiment of the invention, when activation occurs, the currently present position setpoint value is also fed to the fixed value controller and continuously updated.

According to a further exemplary embodiment of the invention, a vehicle having a steering device as described above is provided.

According to a further exemplary embodiment of the invention, the use of a steering device in a vehicle is specified.

According to a further exemplary embodiment of the invention, a method is specified for adjusting a wheel steering angle of a wheel of a motor vehicle, in which method input signals are made available to a first acquisition unit, wherein the input signals represent at least the vehicle speed and the driver steering angle. Furthermore, a first steering angle setpoint value is acquired by the first acquisition unit on the basis of the input signals, and a steering tie rod travel setpoint value is adjusted by an actuator (travel) control system on the basis of the steering angle setpoint value. As a result, the wheel steering angle of the wheel is changed by the wheel guide member on the basis of the steering tie rod setpoint value which has been calculated.

According to a further exemplary embodiment of the invention, a second, corrected steering angle setpoint value is acquired from the first steering angle setpoint value by an arbitration unit, wherein the steering tie rod travel setpoint value is calculated on the basis of the second, corrected steering angle setpoint value, and wherein the steering tie rod travel setpoint value is also calculated by a second acquisition unit which is connected upstream of the actuator travel control system.

According to a further exemplary embodiment of the invention, a program element is specified which, when executed on a processor, instructs the processor to carry out the steps specified above.

According to a further exemplary embodiment of the invention, a computer-readable medium is specified on which a program element is stored which, when executed on a processor, instructs the processor to carry out the method steps specified above.

In the text which follows, preferred exemplary embodiments of the invention will be described with reference to the figures.

DETAILED DESCRIPTION OF THE PREFERRED EMBODIMENTS

The illustrations in the figures are schematic and not to scale.

In the following description of the figures, the same reference numbers are used for the same or similar elements.

Figure 1:
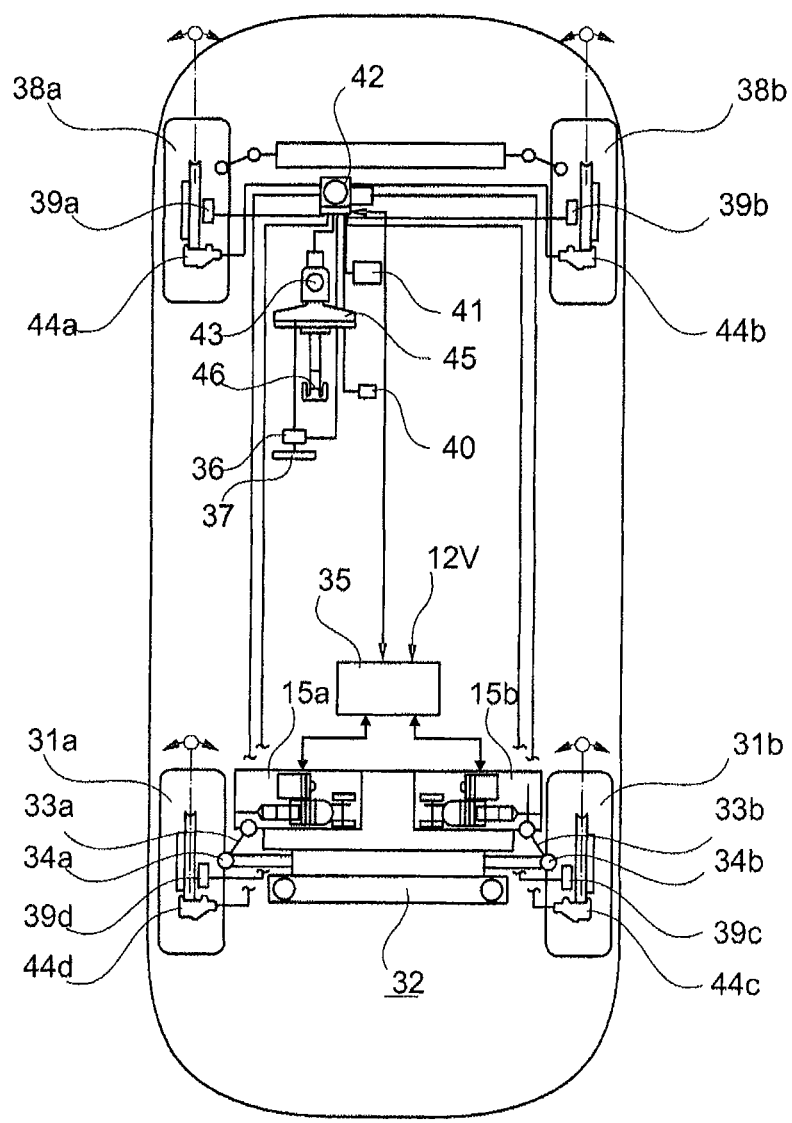
FIG. 1 is a schematic illustration of an ARK system arrangement (steering device) having two individual actuators.
Figure 2:
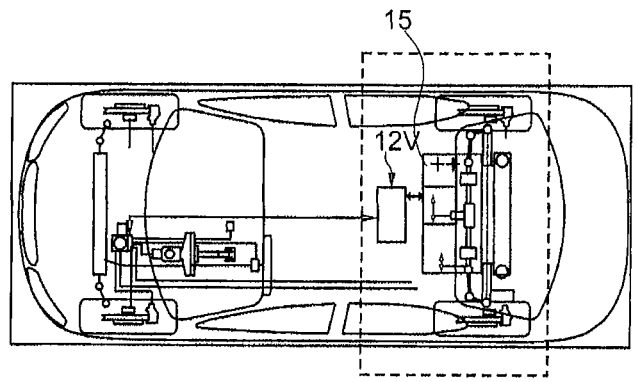
FIG. 2 shows an ARK system arrangement having a central actuator.

FIGS. 1 and 2 show two rear-wheel steering systems (ARK), each with two individual actuators or one central actuator.

The rear-wheel steering systems in FIGS. 1 and 2 have already been described in detail in WO 2006/117343 and will be considered below only to the extent necessary. The wheel-specific steering movement of the two rear wheels 31a, 31b is brought about here by means of a steering tie rod, which can be adjusted electromechanically by means of 2 electric motors, of the rear-axle integral mount.

FIG. 1 shows, in a schematic illustration, a four-wheel motor vehicle with a left-hand rear wheel 31a and a right-hand rear wheel 31b. The rear wheels 31a, 31b are attached to the vehicle by means of a rear-axle mount 32. Each rear wheel 31a, 31b is assigned a steering tie rod 15a and 15b, which are each a steering tie rod 15 with adjustable length. The steering tie rods engage on the rear wheels 31a, 31b via levers 33a, 33b (illustrated schematically in the figure) such that said rear wheels 31a, 31b can be pivoted about an angle by virtue of changes in the length of the steering tie rods 15a, 15b with respect to a pivoting axis 34a, 34b. The levers 33a, 33b result from the fact that the steering tie rods 15a and 15b engage on the wheel mounts outside the center points thereof.

The steering tie rods are actuated by a rear-axle steering control unit 35, to which the steering tie rods 15a, 15b are respectively connected via an electronic interface. The rear-axle steering control unit 35 is supplied here by means of the 12-volt supply voltage of the vehicle's on-board power system. Control commands for actuating the motor of the steering tie rods 15a, 15b, on the one hand, and signals from travel sensors which sense the position of the push rod inside the housing of the steering tie rod, on the other hand, can be transmitted via the interface. The respectively current wheel steering angle of the rear wheels 31a, 31b can be acquired from these signals inside the rear-axle steering control unit 35. The two steering tie rods 15a, 15b can constitute independent modules here which can be actuated independently of one another, such that basically a freely selectable wheel steering angle can be set at each rear wheel 31a, 31b. The actuation is carried out by means of a control method as a function of different vehicle variables which are measured, in particular, by using sensors. The sensor system of a vehicle movement dynamics control system, for example of an ESP (Electronic Stability Program) system is preferably used to carry out the control method. Said sensor system usually comprises a steering angle sensor 36 for sensing the steering angle which the driver has set at the steerable front wheels 38a, 38b by means of a steering handle 37, a wheel speed sensor 39a, 39b, 39c, 39d at each wheel of the vehicle, a pedal travel sensor 40 for sensing the position of the accelerator pedal, and a yaw rate sensor or a sensor cluster 41 which contains a yaw rate sensor, a lateral acceleration sensor and a longitudinal acceleration sensor.

These signals are usually received in an ESP control unit and evaluated. The ESP control unit is usually integrated in an assembly 42 with an electrohydraulic unit for carrying out braking interventions. In this context, the master brake cylinder 43 of the hydraulic vehicle brake system is connected to the wheel brakes 44a, 44b, 44c, 44d via the electrohydraulic unit. In this context, the brake pressure which is built up by the driver via the brake booster 45 by means of a brake activation device 46 can be modified on a wheel-specific basis using electronically controllable valves. In addition, the hydraulic unit has a pressure build-up device with which brake interventions for stabilizing the vehicle can be performed independently of the driver, said braking interventions being controlled by the ESP control unit on the basis of a control method which is known per se to a person skilled in the art.

In the embodiment illustrated in FIG. 1, an interface for transmitting signals between the ESP control unit and the rear-axle steering control unit 35 is provided. The transmission of signals can be carried out here, for example, via a data bus system, such as the CAN (Controller Area Network) which is usually employed in motor vehicles.

The interface can be used to transmit the signals of the ESP sensor system to the rear-axle steering control unit 35, which generates setpoint value specifications for the wheel steering angles of the rear wheels 31a, 31b and/or the lengths of the steering tie rods 15a, 15b as a function of the sensor signals by means of a control method. It may also equally be provided that these setpoint value specifications are determined in the ESP control unit and transmitted via the interface to the rear-axle steering control unit 35, which then actuates the steering tie rods 15a, 15b in accordance with the setpoint value specifications.

Basically, the rear wheels 31a, 31b can be steered in the same direction or in the opposite direction with respect to the steering movement of the front wheels 38a, 38b. Steering the rear wheels 31a, 31b and the front wheels 38a, 38b in the opposite direction reduces the curve radius, while the steering angle at the front wheels 38a, 38b stays the same, and therefore an increase in the agility of the vehicle can be obtained. If the rear wheels 31a, 31b are steered in the same direction as the front wheels, the yaw rate of the vehicle is reduced, and so the vehicle can be stabilized in critical driving situations.

The design of the rear-axle control unit which is illustrated in WO2006/117343 has been considered in detail in applications which have not yet been published.

As is illustrated in FIG. 2, as an alternative to this, in certain rear-axle designs the two individual actuators of the two steering tie rods 15a, 15b in FIG. 1 can also be replaced by a central individual actuator of a central steering tie rod 15.

The arrangements for implementing the steering function which are illustrated schematically in FIGS. 3 to 13 can be applied to the two actuator concepts (central actuator/individual actuator) disclosed in FIGS. 1 and 2.

Figure 3:
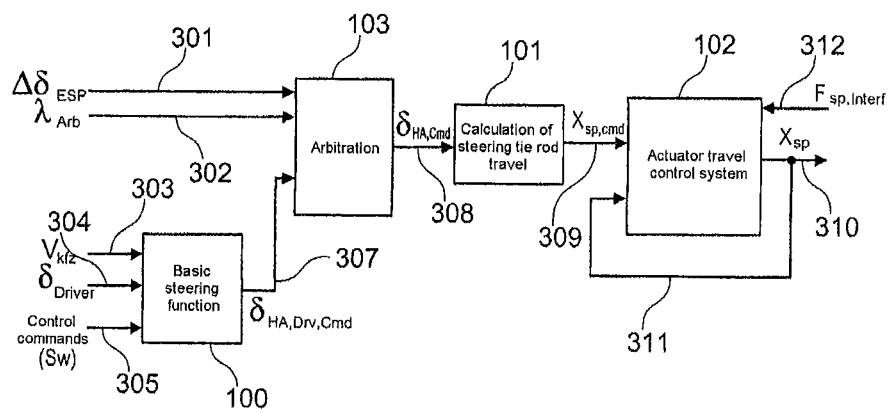
FIG. 3 is a block circuit diagram of a basic structure of the steering function for ARK according to an exemplary embodiment of the invention.

FIG. 3 shows the basic structure of this steering function for ARK according to an exemplary embodiment of the invention. Said structure is composed essentially of the function blocks with the acquisition unit 100 for the basic steering function, the arbitration means or arbitration unit 103 and the second acquisition unit 101 for calculating the steering tie rod travel and the actuator travel control system 102.

The currently measured vehicle speed 303, the driver steering angle 304 and further control commands 305 are fed to the module for making available the basic steering function (first acquisition unit 100). The first acquisition unit 100 calculates, from said currently measured vehicle speed 303, driver steering angle 304 and further control commands 305, the setpoint value 307 for the rear-axle steering angle which is fed to the arbitration unit 103. Furthermore, additional steering angle correction signals 301 and a scaling factor 302 are fed to the arbitration unit 103.

The arbitration unit 103 calculates therefrom a new setpoint value for the rear-axle steering angle 308, which setpoint value is fed to the calculation unit for the steering tie rod travel (second acquisition unit 101). The second acquisition unit 101 then calculates therefrom the steering tie rod setpoint value 309, which is fed to the actuator travel control system 102. Furthermore, a signal for the actual value of the steering tie rod travel 310 is fed to the actuator travel control system 102. A control loop 311 is provided for this purpose. The actuator travel control system 102 calculates therefrom the open-loop or closed-loop control signal for the steering tie rod travel 310. Interference influences such as, for example, those caused by interference excitations by the road, act on the actuator mechanism in the form of an interference force 312 and influence the actuator travel control system.

Input signals for the basic steering function 100 are the vehicle speed $V_{Kfz}$ 303 and the driver steering angle $\delta_{Driver}$ 304 (steering wheel angle and/or wheel steering angle of the front axle), which are made available, for example, by the electronic stability program (ESP) as measurement signals. At this point it is to be noted that, in particular in the case of the steering angle, the signals of this sensor are also directly read in as an alternative to this.

The control commands Sw 305 can be used to influence the function of the acquisition unit 100 for the basic steering function, for example by selecting various vehicle settings (for example sport/comfort). Additional steering angle correction signals $\Delta\delta_{ESP}$ 301 can be predefined by means of a superordinate vehicle movement dynamics controller (not illustrated in FIG. 3).

The steering tie rod travel setpoint value $X_{Sp,Cmd}$ 309 is calculated by the second acquisition unit 101 from the acquired wheel steering angle setpoint values $\delta_{HA,Cmd}$ (from the arbitration unit 103) for the rear-axle steering system, taking into account a model for the steering kinematics of the rear axle, for example in the form of a static characteristic curve.

Figure 4:
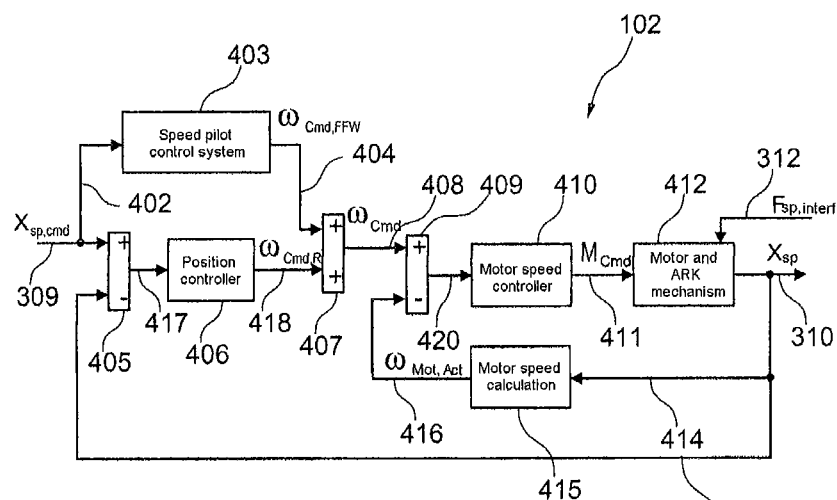
FIG. 4 shows a basic structure of the ARK actuator travel control system according to an exemplary embodiment of the invention.

The structure of the actuator travel control system 102 is shown in FIG. 4. It comprises here a position controller 406, to which a motor speed controller 410 is subordinate.

The input signal 309 is fed to the adder/subtracter 405. The signal of the control loop 311, the actual value of the steering tie rod travel 310, is also fed to the adder/subtracter 405. The result of this addition/subtraction is the steering tie rod travel control error 417 and it is fed to the position controller 406 which calculates a setpoint value 418 which is fed to the adder 407. The input signal 309 is also fed via the line 402 to the speed pilot control system 403 which feeds the output signal 404 to the adder 407.

The signal 408 which results from the addition represents the setpoint value for the motor speed and is fed to the adder/subtracter 409. Likewise, a control signal from a second control loop 416 which represents the actual value for the motor speed is fed to the adder/subtracter 409.

The added/subtracted signals 420 represent the motor speed control error and are then fed to the motor speed controller 410 which generates a signal 411 for the motor (motor setpoint torque) and the ARK mechanism 412. Interference signals in the form of an interference force 312 also act on the unit 412 which constitutes the motor and the ARK mechanism which is coupled to the motor. The output variable of the unit 412 is the steering tie rod travel (output signal 310) which is adjusted by the motor actuated by the motor setpoint torque (signal 411), and by the ARK mechanism.

This output signal 310 is also fed via the first control loop 311 to the first adder/subtracter 405. Furthermore, this signal is fed via the second control loop 414 to the motor speed calculation system 415.

In order to improve the dynamic following behavior, in particular in the case of medium and rapid setpoint value requests for $X_{Sp,Cmd}$, a speed pilot control system (direct specification of the setpoint motor speed on the basis of the profile of the setpoint position) is additionally provided as well as the position controller 406. The setpoint value $\omega_{Cmd}$ 408 for the speed controller 410 is obtained from the addition of the two signals $\omega_{Cmd,Reg}$ 418 and $\omega_{Cmd,FFW}$ 404. The steering tie rod travel $X_{Sp}$ 310 is measured by means of a suitable sensor. The motor speed signal $\omega_{Mot,Act}$ 416 which is required for the speed control can be acquired by differentiation from $X_{Sp}$ in the motor speed acquisition unit 415.

Figure 5:
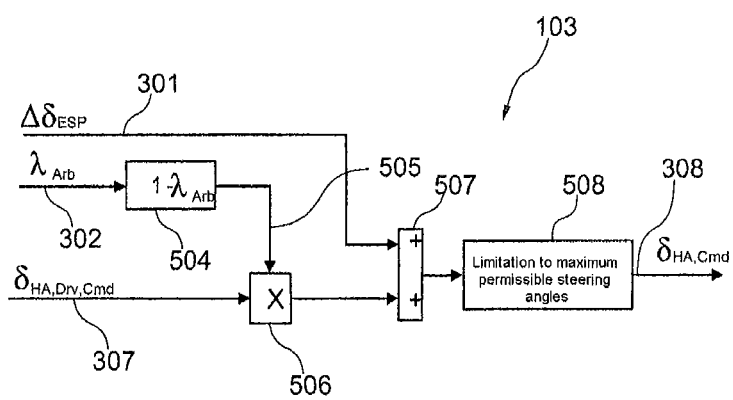
FIG. 5 is a block circuit diagram of the arbitration of the steering angle setpoint values according to an exemplary embodiment.

The function of the arbitration of the steering angle setpoint values which is illustrated in FIG. 3 is shown in FIG. 5. The resulting setpoint value $\delta_{HA,Cmd}$ 308 is obtained here from the addition of the setpoint value $\delta_{HA,Drv,Cmd}$ 307 which is acquired on the basis of the basic steering function and which represents the setpoint value based on the driver specification and the additional steering angle correction signal $\Delta\delta_{ESP}$ 301, which can be specified by a superordinate vehicle movement dynamics controller for the rear-axle steering angle. In addition, the driver portion can be attenuated or set to zero by means of the scaling factor $\lambda_{Arb}$ 302 (0 ... 1) if this appears appropriate in terms of vehicle movement dynamics (for example in the case of steering angle corrections at the rear axle during a μ-split braking operation). If the driver portion is set to zero, the scaling factor $\lambda_{Arb}$ 302 assumes the value $\lambda_{Arb}=1$.

As can be seen in FIG. 5, in order to attenuate the driver portion by means of the scaling factor 302, the latter is converted in the unit 504 by subtracting it from the value 1. The result of this conversion is fed via the line 505 to the multiplier module 506, in order to multiply it by the setpoint value 503 acquired by the basic steering function. For the value $\lambda_{Arb}=1$, the result of the conversion performed in the unit 504, and therefore also the driver portion contained in the steering angle setpoint value, is zero. For the value $\lambda_{Arb}=0$ analogously thereto no attenuation of the driver portion takes place. The result of the multiplication in the multiplier module 506 represents the setpoint value 503 which is modified by means of the scaling factor 302 and acquired by the basic steering function, and said result is then fed to the adder 507 and added to the additional steering angle correction signal 501, after which the steering angle is limited to the maximum permissible steering angle by the limiting unit 508. The resulting setpoint value 308 is then fed to the second acquisition unit 101.

Figure 6:
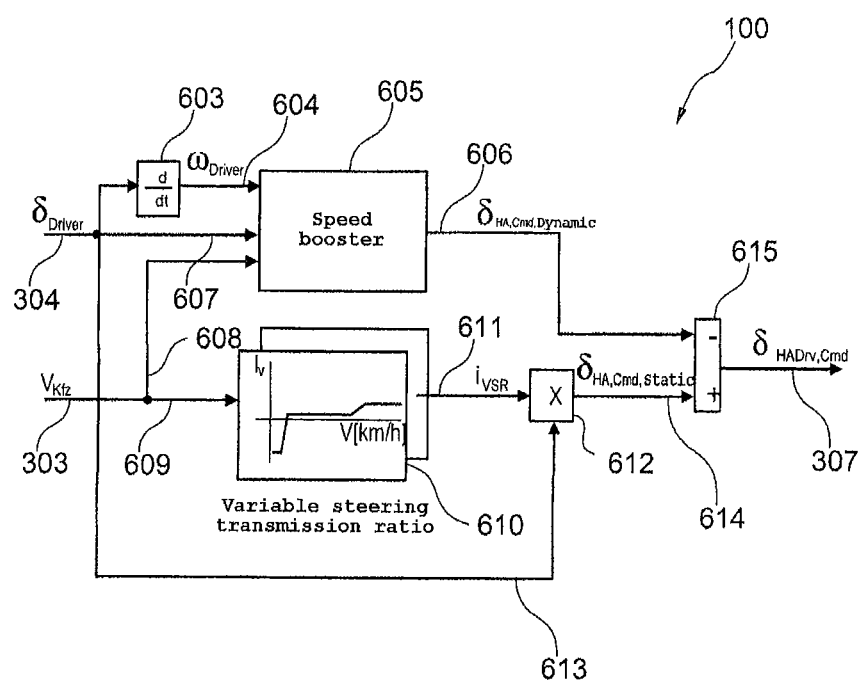
FIG. 6 shows a basic steering function with a variable transmission ratio for a rear-wheel steering system or front-wheel steering system, taking into account the driver's specifications according to an exemplary embodiment of the invention.

The basic steering function 100 is illustrated in FIG. 6. The input signals for the basic steering function are the vehicle speed $V_{Kfz}$ 303 and the driver steering angle $\delta_{Driver}$ 304 (steering wheel angle and/or wheel steering angle of the front axle) which are available, for example, in the ESP as measurement signals.

The driver steering angle 304 is fed, on the one hand, directly to the speed booster unit 605 via the signal path 607. Furthermore, this value is converted in the calculation unit 603 into a steering angle speed 604 which is then likewise fed to the speed booster unit 605. Furthermore, the vehicle speed 303 is fed to the speed booster unit 605 (see signal path 608).

The speed booster unit 605 calculates therefrom the dynamic portion 606 for the steering angle setpoint value which is fed to the adder/subtracter 601.

The vehicle speed is transferred via the line 609 to the steering booster unit (also referred to as steering transmission ratio unit) 610 in order to acquire a variable steering transmission factor $i_{VSR}$ 611. This value 611 is then fed to the multiplier 612. Furthermore, the driver steering angle 304 is fed to the multiplier 612 (see data line 613).

The result of the multiplication constitutes the static steering angle portion 614 and is likewise fed to the adder/subtracter 615, which outputs the setpoint value 307 as a result.

If the driver steering angle $\delta_{Driver}$ 304 is present as a steering wheel angle signal, it must firstly be converted into corresponding wheel steering angles taking into account the steering transmission ratio of the front axle. Since no further vehicle movement dynamic state variables such as, for example, yaw rate or lateral acceleration, are fed back here, this function can be considered to be a purely open-loop control function. The function of this basic steering function can be influenced using the control commands Sw (not illustrated in FIG. 6). This may include, on the one hand, the selection of a characteristic curve for the variable steering transmission ratio or the activation or deactivation of the speed booster function.

The setpoint value $\delta_{HA,Drv,Cmd}$ 307 for the rear-axle steering angle represents the steering specification of the driver and is composed of a static steering angle portion $\delta_{HA,Cmd,Static}$ 614 and a dynamic portion $\delta_{HA,Cmd,Dynamic}$. The static portion includes a variable steering transmission ratio, wherein, on the basis of a transmission factor $i_{VSR}$ 611 which is dependent on the vehicle speed $V_{Kfz}$, the rear wheels are also steered in the same direction ($i_{VSR}>0$) or in the opposite direction ($i_{VSR}<0$) in accordance with the front-wheel steering wheel which has been set. The rear wheels also being steered in the same direction leads to an increase in the driving stability, whilst steering the rear wheels in the opposite direction brings about an increase in the agility of the vehicle and a reduction in the steering effort when parking.

The (static) characteristic curve for the variable steering transmission ratio is usually defined in such a way that in the maneuvering range (low vehicle speeds<20-30 km/h) an $i_{VSR}<0$ is selected in order to reduce the steering effort, while at high speeds (high-speed driving range>100-120 km/h) a transmission ratio of $i_{VSR}>0$ is selected in order to increase the driving stability. In the range of the vehicle movement dynamics ($V_{Kfz}=30 \ldots 100\text{-}120$ km/h) between said ranges it is possible, depending on the vehicle and the setting objective, either to define a setting which acts in the same direction (increase in the driving stability but also relatively large steering effort) or else a setting which acts in the opposite direction (increase in agility but negative effect on the driving stability).

The speed booster function illustrated in FIG. 6, which is carried out in the speed booster unit 605, serves to overcome this conflict of objectives. When the driver makes high-speed steering angle movements, said speed booster unit 605 briefly superimposes on the static steering angle portion $\delta_{HA,Cmd,Static}$ 614 a dynamic portion $\delta_{HA,Cmd,Dynamic}$ 606 which is essentially dependent on the steering angle speed and is subtracted from the static portion in the adder/subtracter 615 and therefore acts in the opposite direction to the steering movement of the driver. This dynamic setpoint value portion then serves to increase the vehicle agility and is generated only in the speed range which is relevant in terms of vehicle movement dynamics ($V_{Kfz}$=30 . . . 100-120 km/h, see above). For reasons of driving stability, a transmission ratio of $i_{VSR}$>0 is selected here for the variable steering transmission ratio characteristic curve, such that a rear-wheel steering angle portion in the same direction as the driver steering angle is present as a basic function.

The method of operation of the speed booster function will be considered in more detail below. As long as $V_{Kfz}$<$V_{Kfz,Min}$ (for example <30 km/h) or $V_{Kfz}$<$V_{Kfz,Max}$ (for example >100 km/h), $\delta_{HA,Cmd,Dynamic}$=0. If $V_{Kfz}$ is then such that $V_{Kfz,Min}$<=$V_{Kfz}$<=$V_{Kfz,Max}$ and if only slow steering movements of the driver are taking place, likewise no dynamic portion is generated and also only the static characteristic curve is active for the steering function. If the steering angle speed of the driver $\omega_{Driver}$ is higher than a predefined activation threshold $\omega_{Driver,Sw,Act}$, a steering angle setpoint value $\delta_{HA,Cmd,Dynamic}$ which is dependent on the current maximum value of the steering angle speed $\omega_{Driver,Max}$ is generated until the current value of $\omega_{Driver}$ drops below a second threshold $\omega_{Driver,Sw,Deact}$=$k*\omega_{Driver,Sw,Act}$ again. The maximum value of the steering angle speed $\omega_{Driver,Max}$ is continuously updated during this time. The parameter k can be selected in an application-specific fashion (appropriate values k=0.5±0.2). The function $\delta_{HA,Cmd,Dynamic}$=f($\omega_{Driver,Max}$) can be a proportional relationship or else a non-linear function which is defined, for example, in the form of a corresponding characteristic curve. If the current value of $\omega_{Driver}$ drops below the threshold $\omega_{Driver,Sw,Deact}$, the value for $\delta_{HA,Cmd,Dynamic}$ which is present at this time is slowly reduced in a linear fashion to the value 0. This is carried out within a predefined time T. If steering angle speed $\omega_{Driver}$ which exceed the activation threshold $\omega_{Driver,Sw,Act}$ occur during this time period (for example during slalom driving or when changing lane), this process is aborted and a steering angle setpoint value $\delta_{HA,Cmd,Dynamic}$=f($\omega_{Driver,Max}$) is generated again.

The dynamic portion includes a speed booster function which, when the driver makes high-speed steering angle movements, briefly superimposes on the static steering angle portion $\delta_{HA,Cmd,Static}$ a dynamic portion $\delta_{HA,Ccmd,Dynamic}$ which is essentially dependent on the steering angle speed and leads to an increase in the vehicle agility in the speed range which is relevant in terms of vehicle movement dynamics.

The static portion of the structure shown in FIG. 6 takes into account only the vehicle speed $V_{Kfz}$ in the steering transmission ratio variable for calculating the transmission factor $i_{VSR}$. Input variables of the driver such as steering wheel angle and steering wheel speed (driver's request) are not taken into account here. Therefore, an improvement in the basic steering function described above consists in taking into account these input variables in the steering transmission ratio variable. Depending on the type of vehicle, setting objective for the vehicle and desired functional scope for the steering function, this expansion of the basic steering function can also lead to a situation in which the dynamic portion $\delta_{HA,Cmd,Dynamic}$ illustrated in FIG. 6 can be dispensed with.

The methods described above and in the text which follows are independent of a specific structural embodiment of the rear-wheel steering system and can be used both in a steering arrangement with two separate individual actuators for each rear wheel and with a central actuator.

Figure 7:
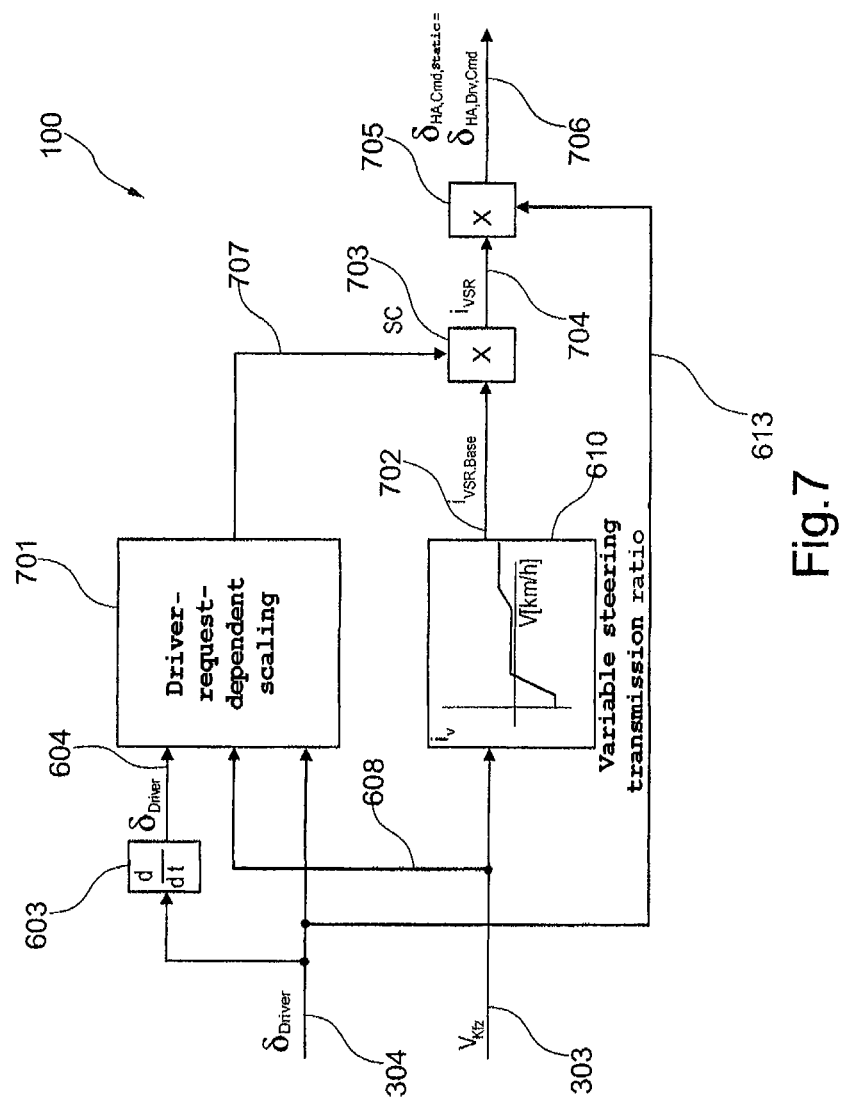
FIG. 7 shows a further basic structure of a variable steering transmission ratio for a rear-wheel steering system or front-wheel steering system, taking into account the driver's specifications according to a further exemplary embodiment of the invention.

The basic structure of the basic steering function according to this exemplary embodiment of the invention is illustrated in FIG. 7. The static portion 614 of the ARK steering function in FIG. 6 is expanded by adding the function of scaling SC 707 which is dependent on the driver's request. The scaling module 701 is provided for calculating the scaling.

The input variables for this function are the driver steering wheel angle 304, the steering wheel angle speed 604 and additionally the vehicle speed 303. The transmission factor $i_{VSR}$ 704 is obtained from a static characteristic curve (from the steering transmission module 610) which is dependent on the vehicle speed, and is multiplied by the output signal SC 707 of the scaling function in the multiplier unit 703. It is therefore possible for the transmission factor to be modified in accordance with the setting criteria described above, as a function of the driver specifications. This modification can lead to an increase or reduction in the basic value $i_{VSR,Base}$ 702, which can also include a change of sign (only brief if appropriate). This is in turn dependent on the vehicle in question and the selected setting objective. Through the modification of this basic value it is already possible, for example, to change for a brief time a basic setting which acts in the same direction (increase in driving stability but also greater steering effort) as a function of the driver's request or of demand into a setting which acts in the opposite direction (increase in agility but negative effect on the driving stability). The transmission factor $i_{VSR}$ 704 is multiplied by the driver steering angle 304 in order to calculate the setpoint value for the rear-axle steering angle on the basis of the steering specification of the driver in the multiplier unit 705 (see line 613).

On the basis of this new calculation method for the variable steering transmission ratio, the setpoint value $\delta_{HA,Cmd,Static}$ 706 is obtained for the steering actuator. If it is possible to dispense with the superimposition of a dynamic portion $\delta_{HA,Cmd,Dynamic}$ by virtue of this basic structure and the parameterization of the scaling function, the setpoint value $\delta_{HA,Cmd,Static}$ corresponds to the resulting setpoint value $\delta_{HA,Drv,Cmd}$ for the rear-axle steering angle.

Figure 8:
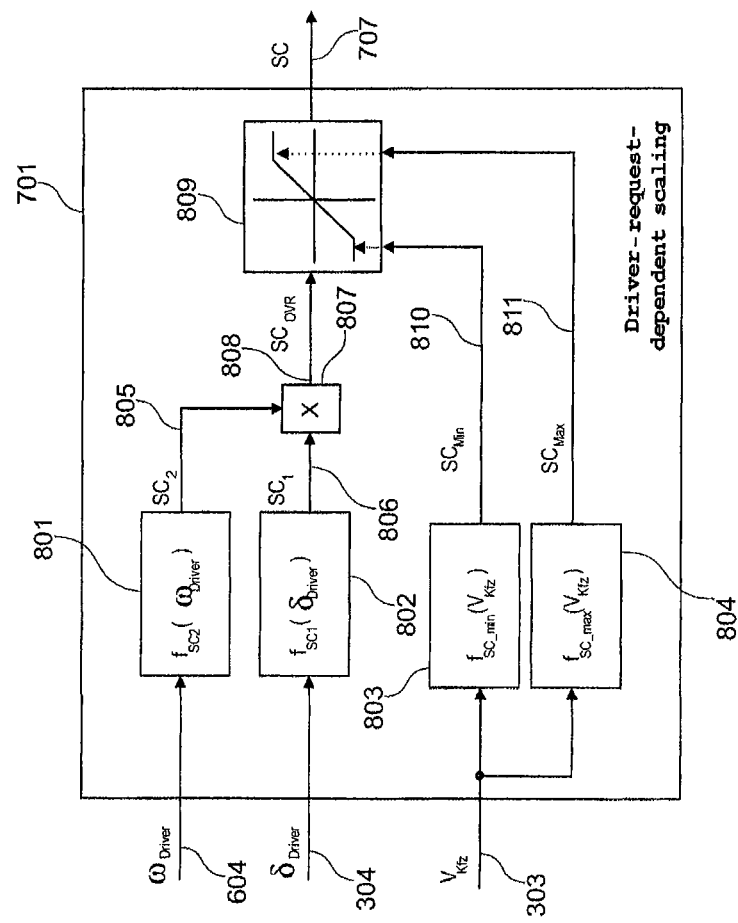
FIG. 8 is a block circuit diagram of driver-request-dependent scaling for a steering transmission factor $i_{VSR,Base}$ according to an exemplary embodiment of the invention.

FIG. 8 shows a method of executing the driver-request-dependent scaling function by means of the scaling unit 701 in more detail. Here, separate calculation of the scaling factor SC1=$f_{SC1}(\delta_{Driver})$ 806, in the first calculation unit 802, and of the scaling factor SC2=$f_{SC2}(\delta_{Driver})$ 805, in the second calculation unit 801, for the steering wheel angle $\delta_{Driver}$ 304 and steering wheel angle speed $\omega_{Driver}$ 604 input signals, is carried out. The multiplication of these two factors in the multiplier unit 807 yields a total scaling $SC_{OVR}$ 808 for the basic value $i_{VSR,Base}$.

The subsequent limiting function 809 limits this factor $SC_{OVR}$ to values which are appropriate in terms of driving stability. For this purpose, the minimum and maximum values $SC_{Min}$=$f_{SC\_Min}(V_{Kfz})$ 810 and $SC_{Max}$=$f_{SC\_Max}(V_{Kfz})$ 811 are acquired for the scaling factor SC 707 as a function of the vehicle speed using the modules 803 and 804, respectively. Said modules determine, in terms of driving stability, how strong this influence of the basic characteristic curve can be or how far the modified steering transmission factor can depart from the basic value.

The functions SC1=$f_{SC1}(\delta_{Driver})$ and SC2=$f_{SC2}(\delta_{Driver})$ as well as $SC_{Min}$=$f_{SC\_Min}(V_{Kfz})$ and $SC_{Max}$=$f_{SC\_Max}(V_{Kfz})$ illustrated in FIG. 8 are very application-specific, since they are strongly linked to the vehicle type and to the setting objective (see above) defined therefor. They can be modeled in the form of linear or non-linear equations or described as characteristic curves or tables.

The output variable of the limiting function is simultaneously the output variable of the driver-request-dependent scaling function and represents the resulting scaling SC for the basic value $i_{VSR,Base}$.

As an alternative to the method of execution according to FIG. 8, the scaling factor can also be calculated on the basis of the illustrated input signals using fuzzy logic. In this context, membership functions are used to assign linguistic values such as for example SMALL, MEDIUM and LARGE to the input data. SC is then calculated using fuzzy logic operations on these input data (if/then rules).

In the case of a vehicle setting which acts in the opposite direction, the problem may arise that although the vehicle has a high degree of agility in the speed range in question, this can, however, then lead to excessively agile driving behavior, for example in the case of an avoidance maneuver due to an emergency situation or hazardous situation, wherein the driving stability which is necessary in this situation is adversely affected to a high degree.

In order to overcome this conflict of objectives, the steering system of the electromechanical rear-wheel steering system (ARK) can, according to a further exemplary embodiment of the invention, be networked to a surroundings sensor system, for example a radar sensor, located in the vehicle. For example, in vehicles with inter-vehicle distance control systems, such a radar sensor is a component of this system. Its information relating to the distance from vehicles traveling ahead or generally from objects located in front of the vehicle is then also available to the ARK system or can be made available to the ARK system and also used by it. By taking into account this additional sensor information, the vehicle setting for the ARK (and therefore the overall behavior of the vehicle) can then be adapted to a detected hazardous situation. This is essential in particular if a setting which acts in the opposite direction or a setting which acts only slightly in the same direction has been selected as a vehicle setting.

Figure 9A:
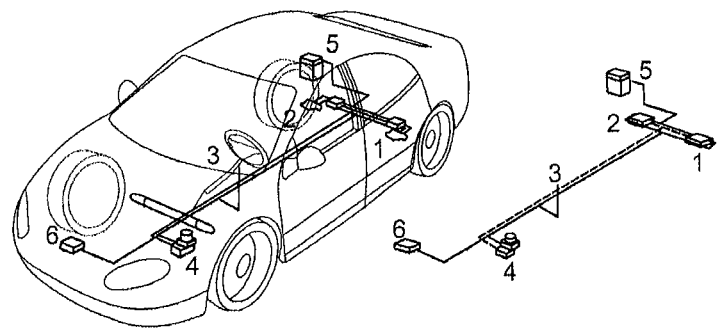
FIG. 9A is a schematic illustration of networking of the ARK system with a surroundings sensor system (radar sensor) for adapting the ARK steering function to hazardous situations according to an exemplary embodiment of the invention.

A resulting system arrangement is illustrated in FIG. 9A. FIG. 9A shows the networking of the ARK system to a surroundings sensor system 6 (for example a radar sensor) for adapting the ARK steering function to hazardous situations.

Electromechanical actuators 1 and 2 with an electronic control unit (ECU) are shown. The reference symbol 3 denotes the steering angle sensor and the reference symbol 4 denotes the ESC (electronic stability control). Furthermore, a battery, for example a 12 V battery 5, is provided in order to supply the systems with current. Reference symbol 6 shows the surroundings sensor.

The adaptation of the ARK steering function to a hazardous situation is carried out in the following way: in the basic position, the ARK moves in a basic steering function (see FIG. 6) which is selected in accordance with the setting objectives, wherein, for the characteristic curve of the variable steering transmission ratio and the boosting of the speed, now a setting which acts more in the opposite direction, and which increases the agility of the vehicle, can be selected. As soon as the radar sensor detects an object located in front (for example vehicle or obstacle), checking is initially carried out to determine whether or not the distance $d_{Obj}$ of the vehicle from this object is to be categorized as critical.

If this distance $d_{Obj}$ drops below a threshold $d_{Obj,critical}$ which is dependent on the vehicle speed $V_{Kfz}$, an emergency situation or hazardous situation in which the driver has to avoid the object located in front of the vehicle is detected. In this case, switching over is now carried out directly from the currently present basic steering function to a static characteristic curve which acts in the same direction to a high degree for the variable steering transmission ratio of the ARK. The avoidance maneuver carried out by the driver can then be performed with a steering characteristic curve which is very stable in terms of vehicle movement dynamics. When the avoidance maneuver is finished (i.e. there is no object present and the driver is steering approximately straight ahead again), for reasons of comfort the previously selected basic position is assumed again after a transition behavior. In order to additionally ensure that there is reliable switching over to the characteristic curve in the same direction, it is also possible, in addition to the monitoring of the distance $d_{Obj}$, to determine, and use as a switching criterion, the time $t_{Obj,critical}$ after which this critical distance $d_{Obj,critical}$ is reached given the present and constant vehicle speed $V_{Kfz}$ and taking into account the acquired speed of change for the object distance $d_{Obj}$.

If the driver also initiates the avoidance maneuver around the object located in front before the critical distance is reached, switching over to the ARK characteristic curve which acts in the same direction does not take place since the situation is not yet a hazardous situation and is evaluated as such, and the avoidance maneuver can also be executed with the selected basic steering function of the ARK.

Figure 9B:
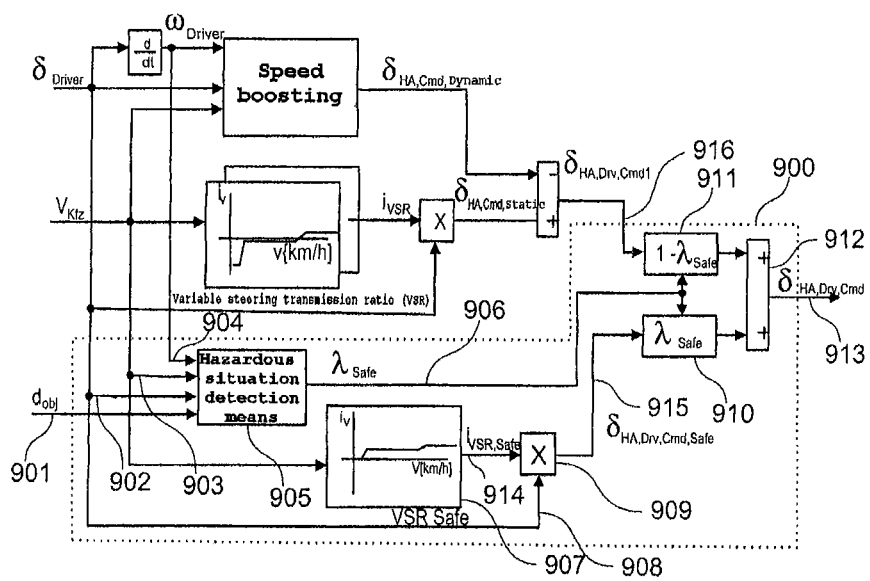
FIG. 9B is a block circuit diagram of an ARK basic steering function, taking into account a surroundings sensor system (radar sensor) for adapting the ARK steering function to hazardous situations according to an exemplary embodiment of the invention.

FIG. 9B is a schematic illustration of an ARK basic steering function taking into account the surroundings sensor system in order to adapt the ARK steering function in hazardous situations. An analysis unit 905 in the form of a hazardous situation detection means is provided, the measured object distance 901, the steering angle 902, the current vehicle speed 903 and the steering angle speed 904 being fed to said analysis unit 905. The analysis unit 905 analyzes the hazardous situation on the basis thereof and outputs a corresponding evaluation parameter 906.

The evaluation parameter 906 is fed to the units 910 and 911.

The module 907 includes a steering characteristic curve which is dependent on the vehicle speed, acts in the same direction to a high degree and generates a steering transmission factor $i_{VSR,Safe}$ 914, which is multiplied by the driver steering angle in the multiplier 909, said driver steering angle being fed to the multiplier via the connecting line 908. This then results in a setpoint value for a safe rear-axle steering angle 915, which is then weighted with the parameter $\lambda_{Safe}$ in the module 910. The original setpoint value for the rear-axle steering angle 916 is weighted with ($1-\lambda_{Safe}$) in accordance with the module 911.

The values from the modules 910 and 911 are added using the adder 912, and the actual setpoint value for the axle steering angle 913 is then obtained therefrom.

The additional modules 905, 907, 909, 910, 911 and 912 can be accommodated in a composite module 900.

The described adaptation of the ARK steering function to a hazardous situation leads to an expansion of the basic steering function (illustrated in FIG. 6) for the ARK and shows FIG. 9B in the form of a signal flowchart. The expansion which is performed by adding the described function is outlined in dashes.

The result of the function block "hazardous situation detection means" 905 is a parameter $\lambda_{Safe}$ 906 which can assume values between 0 and 1. For $\lambda_{Safe}=0$, no hazardous situation is detected and the ARK steering function corresponds to the basic setting already described in FIG. 6. When the hazardous situation is detected, the parameter is set to $\lambda_{Safe}=1$, which causes switching over to occur from this basic function to the characteristic curve which is defined by VSR_Safe and acts in the same direction to a high degree, and the resulting setpoint value $\delta_{HA,Drv,Cmd}$ for the rear-axle steering angle is obtained exclusively on the basis of $\delta_{HA,Drv,Cmd,Safe}$. If the function block "hazardous situation detection means" has detected, on the basis of its input data, that the hazardous situation is no longer occurring or the avoidance maneuver has been finished, the parameter $\lambda_{Safe}$ is reduced continuously from the value $\lambda_{Safe}=1$ to the value $\lambda_{Safe}=0$ after a preset transition time, as a result of which comfortable switching back to the original steering function is performed.

In addition to the networking of the ARK system to the radar sensor, the function block "hazardous situation detection means" illustrated in FIG. 9B constitutes the essential component of the embodiment described in FIG. 9B, since, when a hazardous situation is detected, said function block brings about switching over from a basic steering function, which can now be set more with respect to an increase in the agility, to a steering transmission characteristic curve which acts in the same direction to a high degree for the ARK (increase in the driving stability). This switching over is performed if an object which is located in front (vehicle, obstacle) has been detected by means of the radar sensor and the acquired distance $d_{Obj}$ drops below the threshold $d_{Obj,critical}$. In addition to the safeguarding process or as an alternative thereto, monitoring is performed to determine whether, once an object has been detected, the time $t_{Obj,critical}$ described above after which this critical distance $d_{Obj,critical}$ is reached given the present, constant vehicle speed $V_{Kfz}$ and taking into account the acquired speed of change for the object distance $d_{Obj}$, has expired. A further switching criterion is that the driver has still not initiated an avoidance maneuver at this time, i.e. the driver is still steering approximately straight ahead or is carrying out only small steering movements, which is decided on the basis of the steering wheel angle and the steering wheel angle speed.

The switching back from the steering characteristic curve VSR_Safe to the original steering function has already been dealt with and will therefore not be explained in more detail here.

Figure 10:
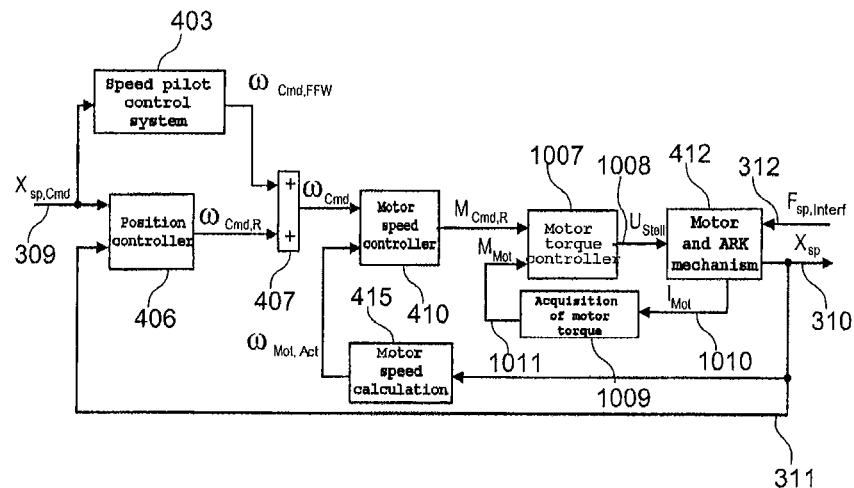
FIG. 10 is a schematic illustration of a basic structure of an ARK actuator travel control system according to an exemplary embodiment of the invention.

FIG. 10 is a schematic illustration of a basic structure of an ARK actuator travel control system according to an exemplary embodiment of the invention.

As already described in FIG. 4, said basic structure comprises a position controller 406 to which a motor speed controller 410 is subordinate. The motor speed controller 410 receives input data from the adder 407 and the motor speed calculation unit 415. The output of the motor speed controller 410 is connected to the motor torque controller 1007. Likewise, the signal $M_{Mot}$ 1011 which was acquired from the signal $I_{Mot}$ 1010 from the motor torque acquisition means 1009 is also fed to the motor torque controller 1007. The actuation signal 1008 is calculated therefrom, for example in the form of a voltage, and is fed to the motor which drives the ARK mechanism unit coupled to the motor.

In order to improve the dynamic following behavior, in particular in the case of medium and high-speed setpoint value requirements for $X_{Sp,Cmd}$, a speed pilot control system (direct specification of the setpoint motor speed on the basis of the profile of the setpoint position) is additionally provided as well as the position controller, as already described in FIG. 4. The setpoint value $\omega_{Cmd}$ for the speed controller is obtained from the addition of the two signals $\omega_{Cmd,Reg}$ and $\omega_{Cmd,FFW}$ in the adder 407. The steering tie rod travel $X_{Sp}$ is measured by means of a suitable sensor. The motor speed signal $\omega_{Mot,Act}$ which is required for the speed control can be acquired by differentiation from $X_{Sp}$. The manipulated variable of the speed controller is a setpoint value for the motor torque $M_{Cmd,R}$, which is set by the subordinate motor torque controller or motor current controller. While the position controller and the motor speed controller are being processed, usually in the loop time of the basic steering function of approximately 2...4 ms (depending on the dynamic requirements and available dynamics of the electrical mechanism), the subordinate motor torque controller is implemented in an analogous fashion in a significantly more rapid loop time of 0.1...0.2 ms which is adapted to the electrical time constant of the motor.

The dimensioning of the controller parameters for the position controller and speed controller is carried out primarily with respect to a good driving behavior with simultaneous minimization of the interference influences which are caused by the interference force $F_{Sp,Interf}$ 312. These result to a decisive degree from interference excitations by the roadway, for example owing to a poor road covering or as a result of the influence of lateral accelerations when cornering or of rapid changes in load.

With the structure illustrated in FIG. 10 there is now the problem that, in particular owing to relatively high frequency interference excitations, which cannot be detected, on the part of the roadway for the controller, the latter is not able to compensate the resulting control errors in the actuator position with sufficient speed and the required accuracy, and therefore significant deviations from the setpoint position of the actuator occur due to interference forces. This has a disruptive effect on the control loop behavior of the ARK, and therefore also on the driving behavior of the vehicle, particularly if an actuator position which has been acquired on the basis of the basic steering function of the rear-wheel steering system is to be kept constant, for example when traveling straight ahead.

An object of the exemplary embodiment of the invention described below is to provide a controller or a steering device of the type mentioned at the beginning, the existing controller structure of which is improved with respect to the control behavior, essentially under the influence of interference forces which cannot be predicted and which vary greatly.

In order to solve the problems discussed above with respect to FIG. 10, an expansion of this control loop structure is provided by adding an additional fixed value controller and a function module which performs the demand-dependent or situation-dependent activation of this fixed value controller. The resulting structure as an expansion of FIG. 10 is shown in FIG. 11.

Figure 11:
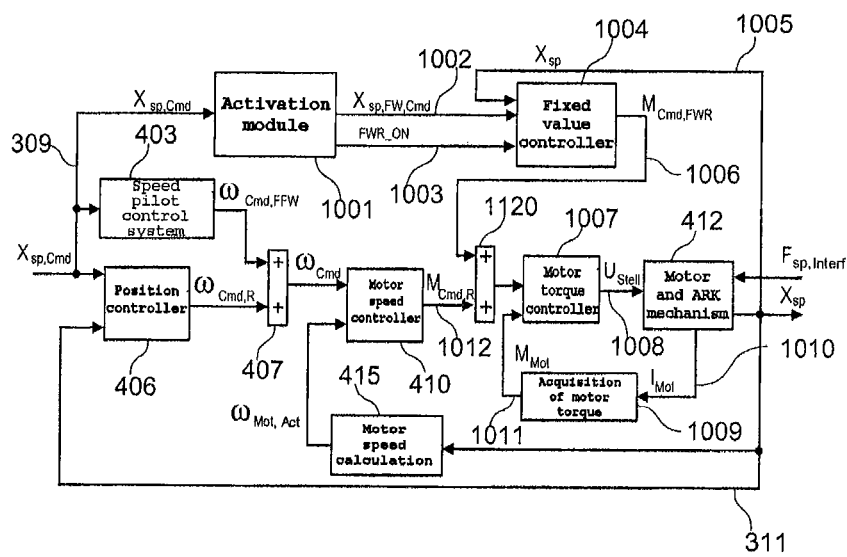
FIG. 11 is a block circuit diagram of a structure of the actuator travel control system with a fixed value control system according to an exemplary embodiment of the invention, which can be activated as a function of a situation.

FIG. 11 is a schematic illustration of a structure of an ARK actuator travel control system with a fixed value control system which can be activated as a function of a situation, in accordance with an exemplary embodiment of the invention.

The arrangement illustrated in the text which follows can be used both in a brush motor and in an electronically commutated motor which is usually employed in the ARK. Moreover, this expansion of the control loop structure is not limited to the application in the ARK, but rather can also be applied to other actuation mechanisms which are driven by an electric motor and in which there is the problem of setting an actuator setpoint position which is predefined and constant or varies only slowly and of keeping it constant or of adjusting it as precisely as possible to the slow changes in setpoint value and in the process eliminating or minimizing the influence of interference forces which act from the outside on the mechanism, cannot be detected and are essentially relatively high in frequency.

FIG. 11 shows a controller structure when the actuator position, which is sensed by means of a travel sensor, is used. In the case of the electronically commutated motors which are usually employed in the ARK, an additional motor angle sensor is available for commutating the motor, said motor angle sensor generally having a relatively high position resolution and likewise being available for control purposes. The resulting controller structure is shown in FIG. 12.

An activation module 1001 is provided, to which the steering tie rod travel setpoint value 309 is fed. The activation module 1001 can activate the fixed value controller 1004 as a function of a situation by means of the signal 1003, and it transmits the current setpoint value 1002 for the fixed value controller to the latter. Furthermore, the measured steering tie rod travel actual value is fed to the fixed value controller 1004 via the line 1005. The fixed value controller 1004 calculates therefrom the additional motor setpoint torque and feeds it to the adder 1120 via the signal line 1006.

This additional motor setpoint torque 1006 is fed to the adder 1120, with the setpoint torque 1012 added to it by the motor speed controller 410, and is fed to the motor torque controller 1007 which generates the actuation signal 1008 therefrom.

Figure 12:
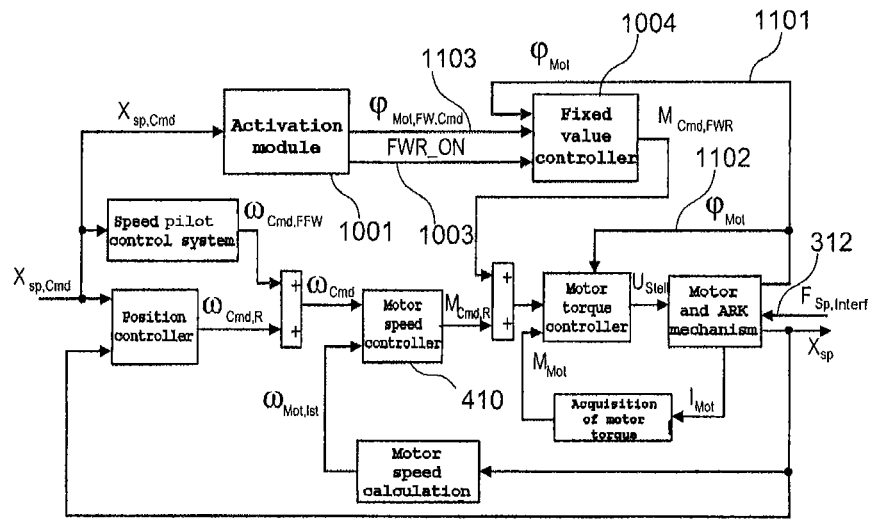
FIG. 12 is a block circuit diagram of a structure of the actuator travel control system with a fixed value control system which can be activated as a function of a situation, during use of an electronically commutated motor according to an exemplary embodiment of the invention.

In the exemplary embodiment in FIG. 12, instead of the actuator position which was acquired by a travel sensor, the angle which was measured by a motor angle sensor is fed to the fixed value controller 1004 via the signal line 1101. This angle is also fed to the motor torque controller via the signal line 1102. The setpoint angle of the motor is transferred from the activation module 1001 to the fixed value controller via the line 1103 (instead of the setpoint value signal 1002 in FIG. 11).

The fixed value controller 1004 illustrated in FIG. 11 and FIG. 12 is a motor position controller with proportional-differential behavior (PD controller 1201), which generates directly an additional motor setpoint torque $M_{Cmd,FWR}$ 1006 which is additively superimposed on the setpoint torque $M_{Cmd,R}$ 1012 of the speed controller 410. It is essential here that this fixed value controller 1004 which is additionally inserted into the control loop and which can be activated by the signal FWR_ON=1 1003 operates in the rapid loop time of the motor torque controller so that the latter can compensate as quickly as possible and with very short reaction times the position errors caused by the interference forces $F_{Sp,Interf}$ 312.

The basic controller, composed of the position controller 406, the speed pilot control system 403 and the motor speed controller 410 then essentially performs the function of setting a good guiding behavior. It is significantly relieved or supported by this measure in the reaction to interference forces. If the fixed value controller is deactivated again, the motor setpoint torque $M_{Cmd,FWR}$ which was generated last is reduced in a ramp shape as far as the value 0 Nm. Since the fixed value controller is a motor position controller, the additional torque is limited to a maximum torque adapted to the application in order to avoid disruptive superimpositions with the position controller of the basic control process when there are excessive deviations of the actual position from the setpoint position.

Figure 13:
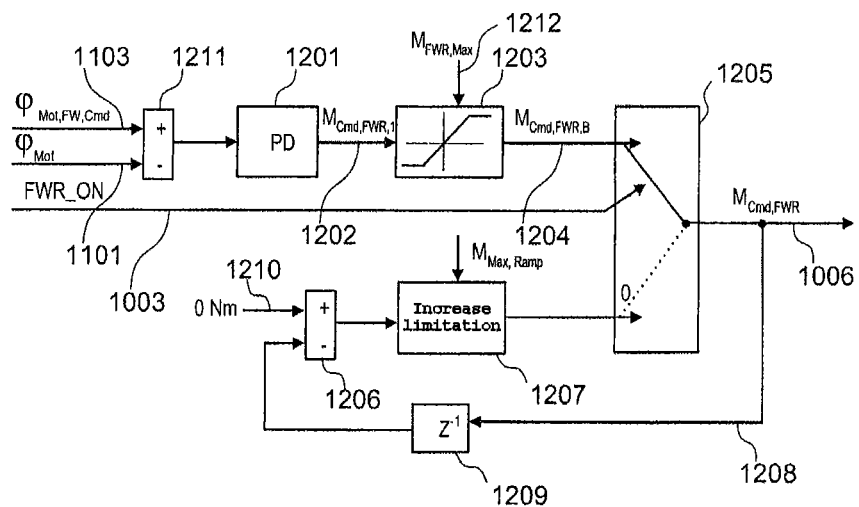
FIG. 13 is a schematic illustration of a structure of a fixed value controller for compensation of interference excitations or external load forces during use of an electronically commutated motor according to an exemplary embodiment of the invention.

FIG. 13 shows the structure of this fixed value controller on the basis of the arrangement according to FIG. 12.

The signal 1103 is fed from the activation module 1001 to the adder/subtracter 1211, and the angle measured by a motor angle sensor is fed to the adder/subtracter 1211 via the signal line 1101. The resulting signal represents the motor angle control error and is fed to the PD controller 1201, which generates therefrom the signal $M_{Cmd,FWR,1}$ 1202 as a manipulated variable and feeds it to the unit 1203.

Likewise, the maximum motor setpoint torque 1212 for the PD controller 1201 is fed to the unit 1203. The unit 1203 limits the signal $M_{Cmd,FWR,1}$ 1202 to the minimum permissible or maximum permissible motor setpoint torque $M_{FWR,Max}$ 1212 and generates, as an output variable, the torque-limited signal $M_{Cmd,FWR,B}$ 1204, which is fed to the downstream switching module 1205. The switching module 1205 is actuated by the signal FWR_ON 1003, which is generated by the activation module 1001. For FWR_ON=1, the fixed value controller 1004 is activated, and the output signal $M_{Cmd,FWR}$ 1006 of the switching module 1205 corresponds to the signal $M_{Cmd,FWR,B}$ 1204. If FWR_ON=0, the output signal $M_{Cmd,FWR}$ 1006 of the switching module 1205 is equal to the output signal of the increase-limiting unit 1207. The units 1210, 1207 and 1209 implement the ramp-shaped reduction in the last-set additional torque to the value 0 if the fixed value controller is deactivated by means of FWR_ON=0. The value ONm is fed to the adder/subtracter 1206 via the signal line 1210, and additionally the output signal $M_{Cmd,FWR}$ 1006 of the switching module 1205, which is first shifted by one sampling step in the module 1209, is fed to the adder/subtracter 1206 via the signal line 1208. The output signal of the adder/subtracter 1206 is fed to the increase-limiting unit 1207, which generates, as an output variable, a signal which reduces the last-set signal 1208 in a ramp shape to the value ONm, in which case the maximum change in the signal per computing step is defined by the value $M_{Max,Ramp}$.

The activation module 1001 illustrated in FIG. 11 and FIG. 12 performs the situation-dependent activation of the fixed value controller 1004. For this purpose, the setpoint value profile for $X_{Sp,Cmd}$ is considered, said setpoint value profile being obtained by the 1st derivative of $X_{Sp,Cmd}$ 309. If this is such that only slow setpoint value changes are predefined for the steering tie rod travel, or the latter is to be kept constant, the fixed value controller is activated to set a good interference behavior by means of the signal FWR_ON=1 1003. During the activation, the setpoint value for the fixed value controller 1004 is likewise transmitted, which setpoint value is represented by the signal $X_{Sp,Fw,Cmd}$ 1002 or $\phi_{Mot;FW;Cmd}$ 1103 and corresponds to the current setpoint value $X_{Sp,Cmd}$.

When there are rapid changes in the steering tie rod travel setpoint value $X_{Sp,Cmd}$, the fixed value controller is deactivated by means of FWR_ON=0. The basic controller then adjusts the steering tie rod travel actual value to these setpoint value changes as quickly as possible. The threshold $V_{Sp,Cmd,On}$ for activation and the threshold $V_{Sp,Cmd,Off}$ for deactivation are application-specific and can be defined specially for the individual application case. It is also conceivable and possible here for these thresholds to be selected to be of such a magnitude that the fixed value controller remains activated even when there are relatively rapid changes in the steering tie rod travel setpoint value $X_{Sp,Cmd}$.

In addition it is to be noted that "comprising" and "having" do not exclude other elements or steps and "a" does not exclude a multiplicity. In addition, it is to be noted that features or steps which have been described with reference to one of the above exemplary embodiments can also be used in combination with other features or steps of other exemplary embodiments described above.

The invention claimed is:

1. A steering device for adjusting a wheel steering angle of a rear wheel of a motor vehicle, the steering device comprising:
   a wheel guide member for changing the wheel steering angle of the rear wheel;
   a steering control unit for controlling the wheel guide member, wherein the steering control unit has a first acquisition unit for a basic steering function, an arbitration unit and an actuator travel control system;

wherein:
the first acquisition unit receives input signals from sensors including at least a vehicle speed $V_{Kfz}$ and a driver steering angle $\delta_{Driver}$, and input control command signals indicating a driving mode set by a driver of the vehicle, and computes a first steering angle setpoint value based on the input signals, the arbitration unit calculates a modified setpoint value based on the first steering angle setpoint value and steering angle correction signals predefined based on the movement dynamics of the motor vehicle, and a scaling factor for attenuating contribution to steering the motor vehicle by the driver, and the actuator travel control system is configured to adjust travel of the rear wheel guide member based on the modified setpoint value and an actual signal value currently being output by the actuator travel control system.

2. The steering device as claimed in claim 1 further comprising:
a second acquisition unit;
wherein the arbitration unit is configured to calculate and output the modified setpoint value to the second acquisition unit; and
wherein the second acquisition unit is connected upstream of the actuator travel control system for calculating travel, which is to be adjusted, of the wheel guide member based on steering kinematics of the rear wheel.

3. The steering device as claimed in claim 2,
wherein the arbitration unit is configured to calculate the steering angle setpoint value on the basis of a setpoint value which is made available by the first acquisition unit and which corresponds to a driver specification, a steering angle correction signal and the scaling factor for attenuating a driver's contribution to the steering of the motor vehicle.

4. The steering device as claimed in claim 2,
wherein the actuator travel control system comprises:
a fixed value controller for determining an additional motor setpoint torque; and
a function module for demand-dependent or situation-dependent activation of the fixed value controller;
wherein the fixed value controller is activated by the function module on the basis of a steering tie rod setpoint value from the second acquisition unit.

5. The steering device as claimed in claim 1,
wherein the steering device is configured to carry out a wheel-specific steering movement.

6. The steering device as claimed in claim 1 further comprising:
a drive unit;
wherein a length of the wheel guide member can be adjusted by the drive unit; and
wherein a change in the length of the wheel guide member brings about a change in the wheel steering angle of the wheel.

7. The steering device as claimed in claim 1 further comprising:
a wheel mount for mounting the wheel;
wherein the wheel mount is connected to a vehicle body via the wheel guide member; and
wherein the wheel mount can be adjusted about an axis extending substantially parallel to a plane of the wheel, and the wheel guide member is coupled to the wheel mount at a distance from the axis.

8. The steering device as claimed in claim 1,
wherein the actuator travel control system includes:
a position controller;
a motor speed controller for an electric motor of the wheel guide member;
a first control loop for making available a motor speed actual value for the electric motor of the wheel guide member; and
a second control loop for making available the actual signal value currently being output by the actuator travel control system for the position controller.

9. The steering device as claimed in claim 1,
wherein the first acquisition unit for the basic steering function includes a speed booster unit for acquiring a dynamic portion for the first steering angle setpoint value.

10. The steering device as claimed in claim 1,
wherein the first acquisition unit for the basic steering function has a steering booster unit for acquiring a variable steering transmission factor ($i_{VSR}$) on the basis of a current vehicle speed, from which a static portion for the first steering angle setpoint value is then calculated as a result of a multiplication of steering transmission factor and driver steering angle.

11. The steering device as claimed in claim 1,
wherein the first acquisition unit computes the first steering angle setpoint value based on a function of a driver's specification.

12. The steering device as claimed in claim 11,
wherein the modification is carried out as a function of the vehicle speed.

13. The steering device as claimed in claim 11,
wherein the driver's specification corresponds to a measured steering wheel angle ($\delta_{Driver}$) and a steering wheel angle speed ($\omega_{Driver}$).

14. The steering device as claimed in claim 11,
wherein the modification is carried out on the basis of fuzzy logic.

15. The steering device as claimed in claim 11,
wherein the steering transmission factor is modified using a scaling factor which is limited, as a function of the velocity, to values which are appropriate in terms of driving stability.

16. The steering device as claimed in claim 1 further comprising:
a sensor device for making available measurement data from surroundings of the vehicle, which are used in computing the setpoint value for the wheel steering angle of the wheel.

17. The steering device as claimed in claim 16,
wherein the sensor device has a sensor selected from the group consisting of a radar sensor, a lidar sensor, an optical sensor and an ultrasonic sensor.

18. The steering device as claimed in claim 16,
wherein the sensor device includes a position-determining unit with a satellite navigation receiver and a digital map.

19. The steering device as claimed in claim 16,
wherein the sensor device is designed to determine a distance between the vehicle and an object.

20. The steering device as claimed in claim 16 further comprising:
an analysis unit for analyzing the measurement data and for detecting a hazardous situation on the basis of the analysis;
wherein the steering device is configured to adapt the basic steering function to the hazardous situation if a hazardous situation has been detected.

21. The steering device as claimed in claim 20,
wherein the adaptation of the steering function to the hazardous situation includes automatic switching over from the basic steering function to a characteristic curve for a variable steering transmission ratio.

22. The steering device as claimed in claim 20, wherein the analysis is based on a distance, determined by the sensor device, between the vehicle and an object and an estimated time after which a critical distance from the object is reached.

23. The steering device as claimed in claim 1, wherein the actuator travel control system comprises:
   a fixed value controller for determining a motor setpoint torque for controlling a motor to adjust the wheel guide member; and
   a function module for demand-dependent or situation-dependent activation of the fixed value controller.

24. The steering device as claimed in claim 23, wherein the motor setpoint torque is determined by the fixed value controller on the basis of a position of a motor of the wheel guide member which is measured by a sensor.

25. The steering device as claimed in claim 24, wherein the sensor is a travel sensor or a motor angle sensor.

26. The steering device as claimed in claim 23, wherein the fixed value controller is a motor controller with a proportional-differential behavior.

27. The steering device as claimed in claim 23, wherein a currently present position value is also fed to the fixed value controller.

28. A method for adjusting a wheel steering angle of a rear wheel of a motor vehicle, the method comprising the steps of:
   providing input signals to a first acquisition unit, wherein the input signals represent at least a vehicle speed $V_{Kfz}$, a driver steering angle $\delta_{Driver}$ and input control command signals indicating a driving mode set by a driver of the vehicle;
   acquiring a first steering angle setpoint value by the first acquisition unit on the based on the input signals;
   calculating a modified setpoint value based on the first steering angle setpoint value and steering angle correction signals predefined based on the movement dynamics of the motor vehicle, and a scaling factor for attenuating contribution to steering the motor vehicle by the driver;
   adjusting a steering tie rod travel setpoint value for the rear wheel by an actuator travel control system based on the modified setpoint value and an actual signal value currently being output by the actuator travel control system; and
   changing the wheel steering angle of the rear wheel by a rear wheel guide member based on the adjusted steering tie rod travel setpoint value.

29. The method as claimed in claim 28 further comprising the steps of:
   calculating the steering tie rod travel setpoint value on the basis of the modified setpoint value; and
   calculating the steering tie rod travel setpoint value by a second acquisition unit.

30. A non-transitory computer-readable medium on which a program element is stored which, when executed on a processor, instructs the processor to carry out the following steps for adjusting a wheel steering angle of a rear wheel of a motor vehicle:
   providing input signals to a first acquisition unit, wherein the input signals represent at least a vehicle speed $V_{Kfz}$, a driver steering angle $\delta_{Driver}$ and input control command signals indicating a driving mode set by a driver of the vehicle;
   acquiring a first steering angle setpoint value by the first acquisition unit based on the input signals;
   calculating a modified setpoint value based on the first steering angle setpoint value and steering angle correction signals predefined based on the movement dynamics of the motor vehicle, and a scaling factor for attenuating contribution to steering the motor vehicle by the driver;
   adjusting a steering tie rod travel setpoint value for the rear wheel by an actuator travel control system based on the modified setpoint value and an actual signal value currently being output by the actuator travel control system; and
   changing the wheel steering angle of the rear wheel by a rear wheel guide member based on the adjusted steering tie rod travel setpoint value.

* * * * *

UNITED STATES PATENT AND TRADEMARK OFFICE
CERTIFICATE OF CORRECTION

PATENT NO. : 8,494,718 B2   Page 1 of 1
APPLICATION NO. : 12/602903
DATED : July 23, 2013
INVENTOR(S) : Muth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this

Fifteenth Day of September, 2015

Michelle K. Lee
*Director of the United States Patent and Trademark Office*